United States Patent [19]

Ellner

[11] Patent Number: 4,899,056
[45] Date of Patent: Feb. 6, 1990

[54] CLEANING SYSTEM FOR ULTRAVIOLET LIGHT PRODUCING LAMPS

[75] Inventor: Sidney Ellner, Bedford, N.Y.

[73] Assignee: Ultraviolet Purification Systems, Inc., Bedford Hills, N.Y.

[21] Appl. No.: 216,403

[22] Filed: Jul. 7, 1988

[51] Int. Cl.[4] .............................................. C02F 1/32
[52] U.S. Cl. ............................. 250/431; 250/432 R; 250/436
[58] Field of Search ................. 250/431, 432 R, 436

[56] References Cited

U.S. PATENT DOCUMENTS

| | | | |
|---|---|---|---|
| 2,732,502 | 1/1956 | Darney | 250/430 |
| 3,102,958 | 9/1963 | King | 250/431 |
| 4,034,219 | 7/1977 | Louden et al. | 250/431 |
| 4,103,167 | 7/1978 | Ellner | 250/432 R |
| 4,482,809 | 11/1984 | Maarschalkerweerd | 250/435 |
| 4,728,368 | 3/1988 | Pedziwiatr | 250/431 |
| 4,755,292 | 7/1988 | Merriam | 250/432 R |
| 4,757,205 | 7/1988 | Latel et al. | 250/435 |

*Primary Examiner*—Jack I. Berman
*Attorney, Agent, or Firm*—Austin R. Miller

[57] ABSTRACT

A method of disinfecting waste water wherein ultraviolet light producing lamps are positioned in lamp modules and contained within quartz lamps jackets and wherein the modules are positioned within a flow of water including removing particulates and films for the lamp jackets wherein one or more of the modules from the flow are removed, transported and inserted into a tank containing a lamp jacket cleaning agent.

The invention further includes a cleaning system for removing particulates and films from lamp jackets consisting of a channel through which waste water to be cleaned passes, one or more modules positioned in the channel, the modules containing one or more ultraviolet light producing lamps, each lamp sealed from direct contact with the water by surrounding quartz jackets, the lamps being spaced apart to permit the water to flow there between to expose the water and ultraviolet light rays. The system further includes channel sealing walls positionable inside the channel to isolate the modules from the water and a cleaning agent positionable inside the isolated portion of the channel to clean the modules.

11 Claims, 8 Drawing Sheets

CLEANING SYSTEM FOR ULTRAVIOLET LIGHT PRODUCING LAMPS

BACKGROUND OF THE INVENTION

The present invention relates to a system for cleaning jackets surrounding ultraviolet light lamps, particularly to a system for cleaning jackets surrounding ultraviolet light lamps used for disinfection of waste water.

FIELD OF THE INVENTION

Industrial operations and municipalities produce enormous quantities of waste water of varying types. Much of this waste water contains microorganisms which may be killed or destroyed by exposure to ultraviolet light. Many of these industrial operations, particularly municipalities, have developed ultraviolet light water disinfection systems. Such systems typically include passage of waste water through an open channel with a multiplicity of ultraviolet light producing lamps positioned in the channel. Passage of waste water in between individual ultraviolet lamps insures exposure to ultraviolet light rays to kill or destroy the various microorganisms, thereby disinfecting the waste water.

Much of the waste water effluent from such industrial operations, municipalities and the like, contain a variety of solids, chemicals in solution and other components in addition to the water. Over time, such particulates tend to accumulate on the jackets surrounding the lamps, thereby preventing ultraviolet light rays from emanating outwardly and into the waste water to kill microorganisms. If exposure to ultraviolet light rays is inadequate, the required number of microorganisms tend not to be killed. Therefore, it is highly desirable to find a means for periodically cleaning the individual surrounding quartz jackets.

U.S. Pat. No. 4,367,410 to Wood discloses ultraviolet light apparatus for purifying secondary waste water effluent by ultraviolet radiation which includes lamp cleaning means. A reciprocating wiper blade moves back and forth over the multiplicity of ultraviolet lamps, thereby wiping away any particles that have accumulated on the outer surface of quartz jacket surrounding the lamps. However, this apparatus tends to be quite cumbersome and is subject to mechanical failure. The reciprocating wiper must remain submerged in the waste water effluent, which in turn subjects it to accumulation of suspended particles. It is also necessary to provide wiping means for each individual lamps. This is undesirable in an installation requiring a multitude of ultraviolet light producing lamps.

OBJECTS OF THE PRESENT INVENTION

It is an object of the present invention to provide a cleaning system for ultraviolet light producing lamp jackets which can clean either all or part of the ultraviolet lamp jackets installed in a waste water cleaning and disinfection system.

It is another object of the present invention to provide a cleaning system which is free from continuous immersion in the waste water and does not require mechanical contact with each lamp jackets.

It is yet another object of the present invention to provide a system which facilitates monitoring, cleaning and maintenance of lamp jackets in a system containing a large number of ultraviolet lamps.

Other objects and advantages of the present invention will become apparent to those skilled in the art from the drawings, the detailed description and the appended claims.

SUMMARY OF THE INVENTION

The present invention provides a system for cleaning lamp jackets of ultraviolet light lamps employed for disinfection of water. In one embodiment of the system, lamp modules are positioned in an open channel through which waste water passes. The modules contain one or more ultraviolet light producing lamps sealed from direct contact with the water by surrounding quartz jackets. The channel is sealed by removable sealing meanings positioned inside the channel to isolate the desired numbers of modules. Cleaning agent is then introduced into the isolated portion of the channel for in place cleaning of the jackets.

The system further provides another embodiment having a separate cleaning tank containing the cleaning agent. The cleaning tank is used to supply cleaning agent to the isolated portion of the channel for in place cleaning of jackets. Another channel pump empties the isolated portion of the channel of waste water. A pump conveys the cleaning agent to the channel and back. The tank may be permanent in nature such as a ground tank or portable.

Still another embodiment of the invention provides a cleaning system for lamp modules employed to disinfect water. A separate cleaning tank containing a cleaning agent is provided nearby an open channel containing one or more ultraviolet light producing lamps mounted in a removable module. The cleaning tank is sized to receive at least one or more of the modules. The cleaning tank may be permanent in nature, such as an in ground tank or portable. The modules are removed from the channel and placed in the tank for cleaning.

DETAILED DESCRIPTION OF THE DRAWINGS

Although a particular form of apparatus has been selected for illustration of the drawings and although specific terms will be used in this specification, for the sake of clarity and describing the apparatus shown, the scope of this invention is defined in the appended claims and is not intended to be limited either by the drawings selected or the terms used in the specification or abstract.

Figure 1:
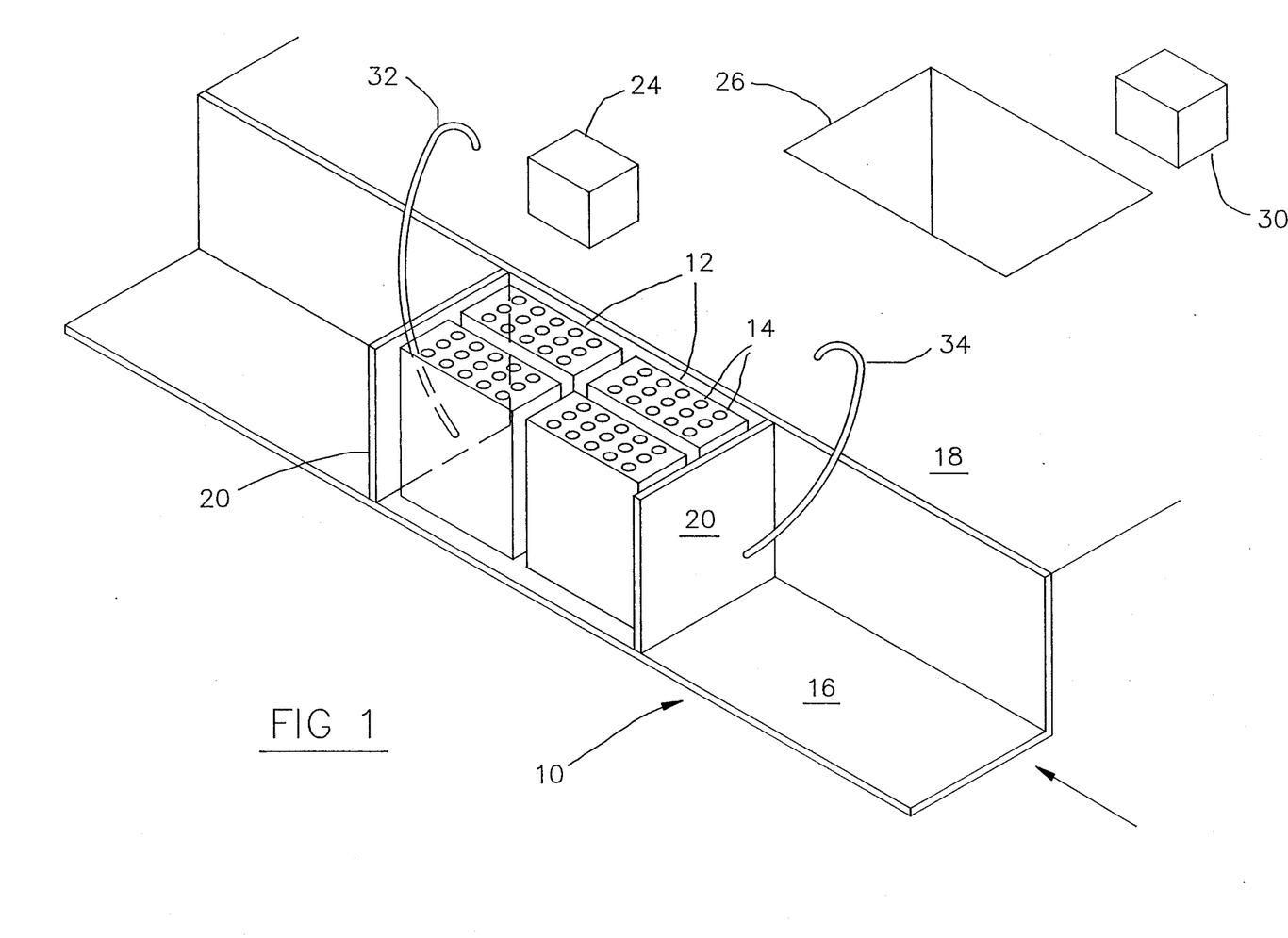
FIG. 1 is a schematic partial perspective view, taken in section, of ultraviolet light modules positioned in an open channel and a cleaning tank in accordance with aspects of the invention.

As shown in FIG. 1, which is a partial perspective view, a waste water channel 10 is shown containing a plurality of ultraviolet light lamp modules 12. Modules 12 each contain a multiplicity of ultraviolet light lamps 14 vertically disposed within module 12 and having spaces therebetween. Modules 12 are positioned within channel 10 to extend substantially across the width of the channel, and extend substantially from the bottom 16 of channel 10, upwardly toward ground level as designated by the numeral 18.

Sealing walls 20 each extend from channel bottom 16 up to ground level 18 and further extend from channel side wall 22 to its opposing side walls (not shown). Each sealing wall 20 seals against the respective channel bottom 16 and side walls 22 to prevent water from passing therethrough. Channel drain pump 24 can preferably drain waste water in between sealing walls 20 as desired. Cleaning tank 26 is filled with cleaning agent 28, which is pumped in between sealing walls 20 by cleaning agent pump 30. Cleaning agent 28 flows through a pipe (not shown) and into flexible hose 32 which connects to downstream sealing wall 20. Cleaning agent 28 circulates to cleaning tank 26 by way of flexible hose 34 and a conduit (not shown).

Figure 2:
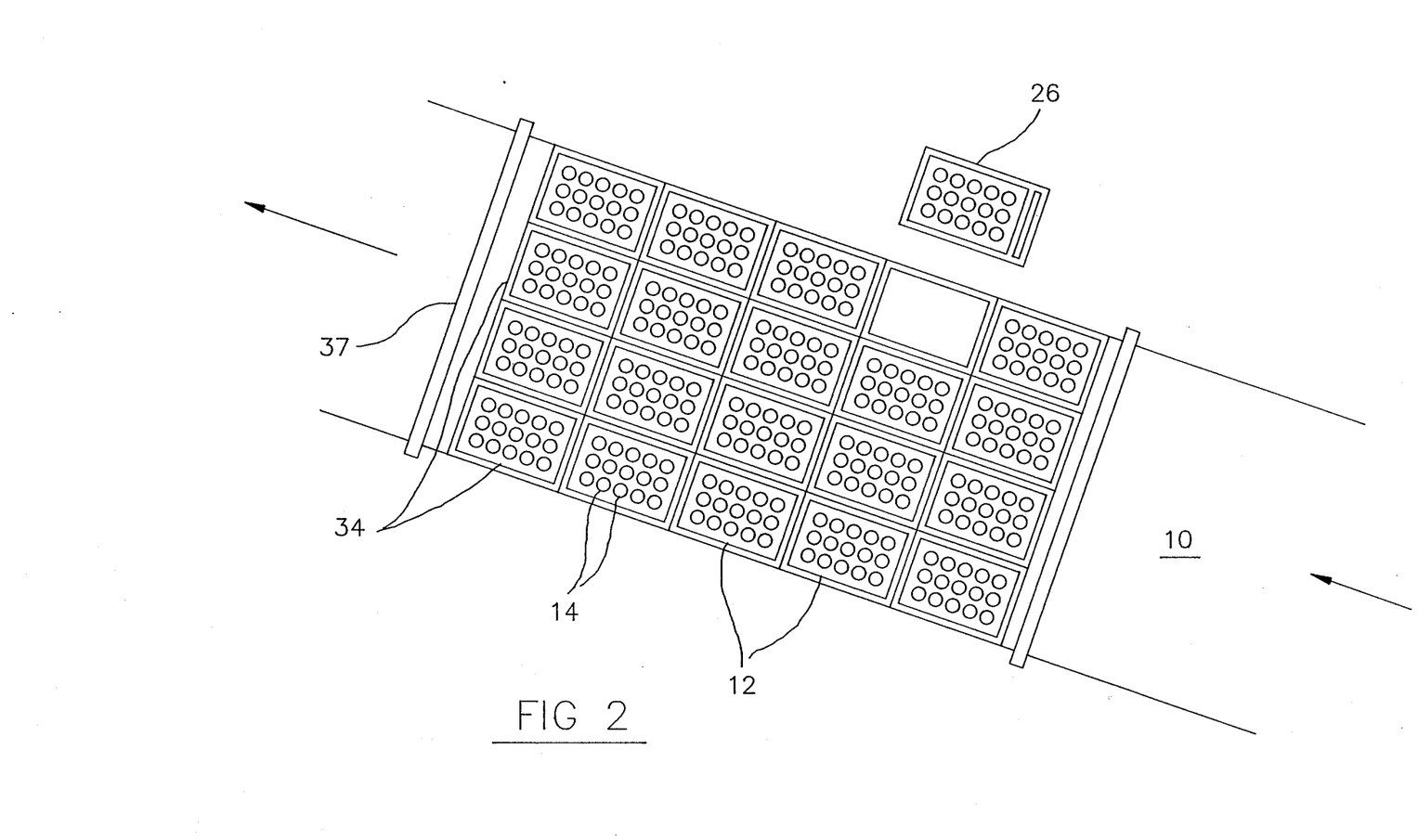
FIG. 2 is a schematic top plan view of ultraviolet light lamp modules in a waste water channel and a cleaning tank in accordance with aspects of the invention.

In FIG. 2, waste water channel 10 is shown containing a plurality of ultraviolet light lamp modules 12. Each module 12 contains a multiplicity of ultraviolet light lamps 14. Modules 12 are positioned within channel 10 on a system of module racks 36. Wall lifts 37 stand over top of channel 10 and on both ends of the modules 12. Lifts 37 raise and lower sealing walls 20 into and out of channel 10.

Figure 3:
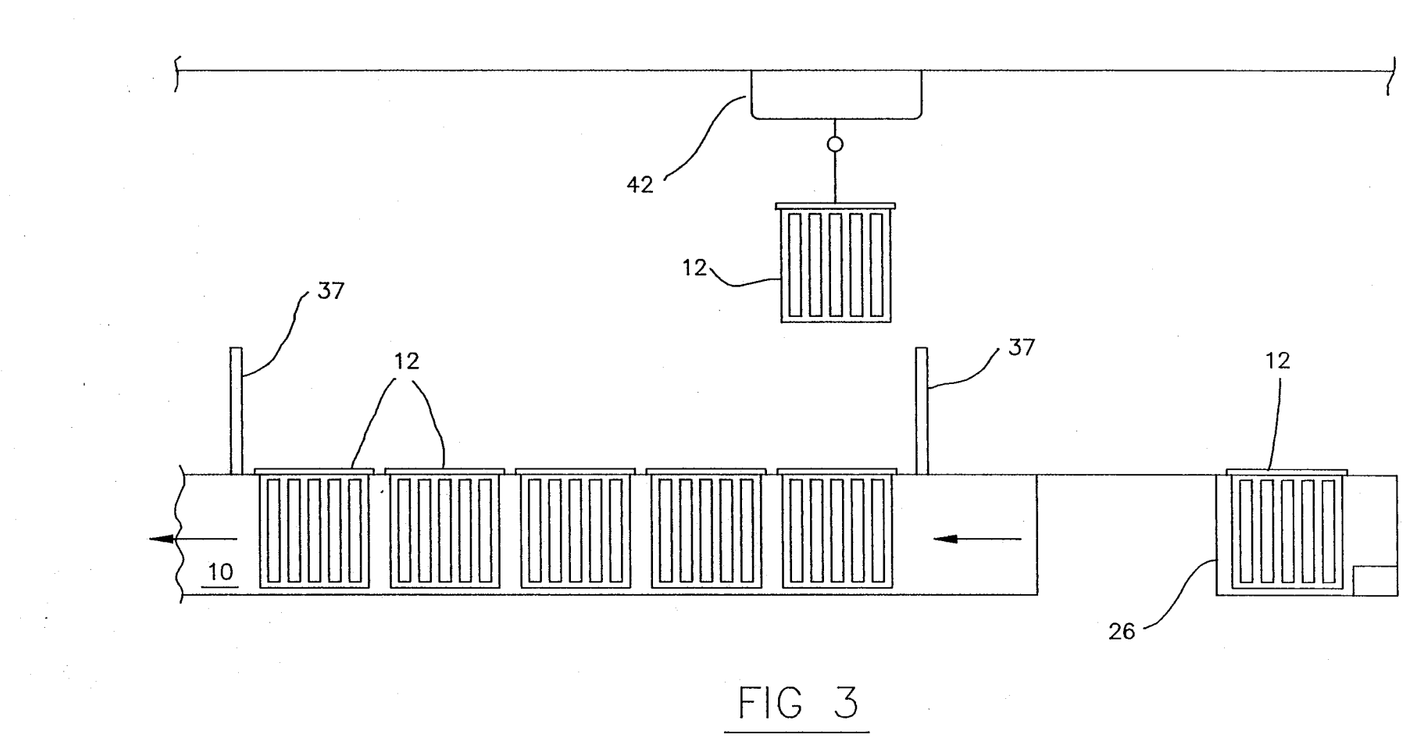
FIG. 3 show a schematic side sectional view of ultraviolet light lamp modules in a waste water channel and a cleaning tank in accordance with aspects of the invention.

FIG. 3 shows waste water channel 10 containing a multiplicity of ultraviolet light lamp modules 12. As overhead transport crane optionally moves modules 12 back and forth between cleaning tank 26. Wall lifts 37 raise and lower sealing walls 20.

Figure 4:
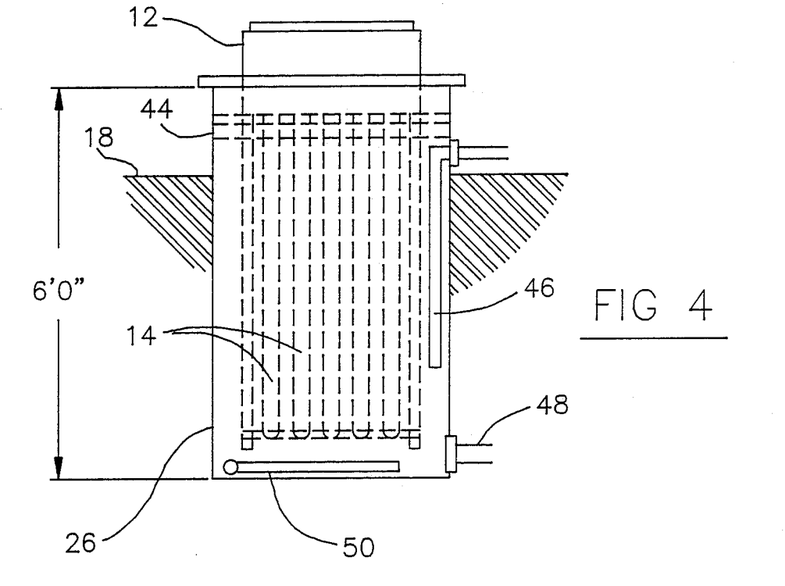
FIG. 4 shows a side sectional view of an ultraviolet lamp module of the invention.

Referring to FIG. 4, an ultraviolet light lamp module 12 has been placed in a cleaning tank 26, which extends both above and below ground level 18. Support rack 44 supports module 12 within cleaning tank 26 to assist in preventing breakage or damage to ultraviolet lamps 14. Cleaning agent 28 pumps into tank 26 by through discharge pipe 46. Similarly, cleaning agent 28 is removed from cleaning agent tank 26 by way of recirculation pipe 48. Air pumps into cleaning tank 26, and therefore, into cleaning agent 28 through of air supply pipe 50.

Figure 4A:
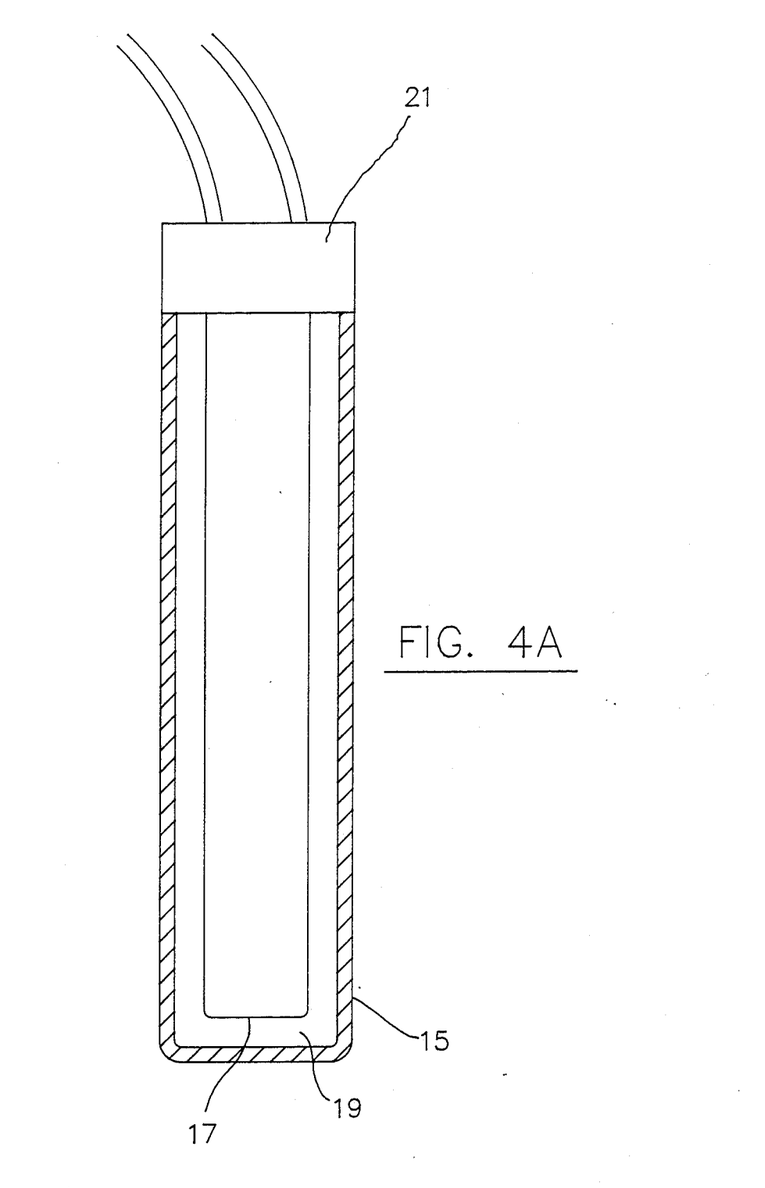
FIG. 4A is a schematic front elevational view, taken in section, of an ultraviolet light producing lamp employed by the invention.

FIG. 4A shows an exploded view of lamp 14. A quartz jacket 15 surrounds ultraviolet light producing bulb 17, with an insulating space 19 therebetween. Quartz jacket 15 and bulb 17 are capped at one end by end cap 21. End cap 21 holds jacket 15 and bulb 17 together. Wires 23 sealingly extend through end cap 21 and provide power to bulb 17.

Figure 5:
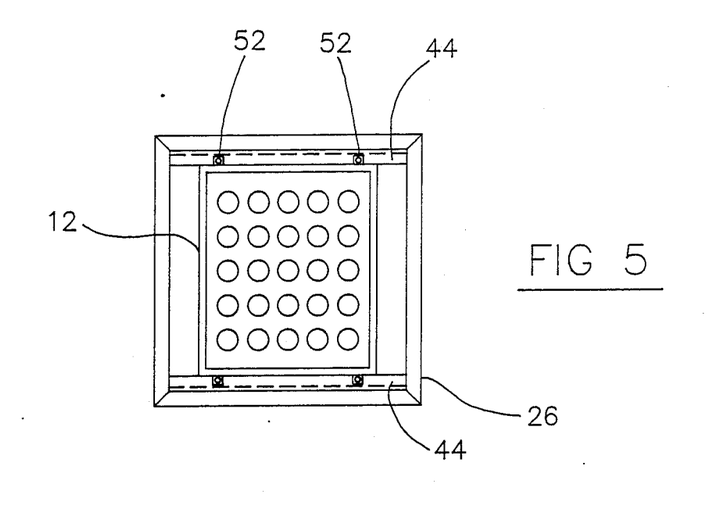
FIG. 5 shows a top plan view of the module shown in FIG. 4.

In FIG. 5, module 12 rests on support rack 44 in cleaning tank 26. Tabs 52 located on the side of module 12, engage support rack 44 to suspend module 12.

Figure 6:
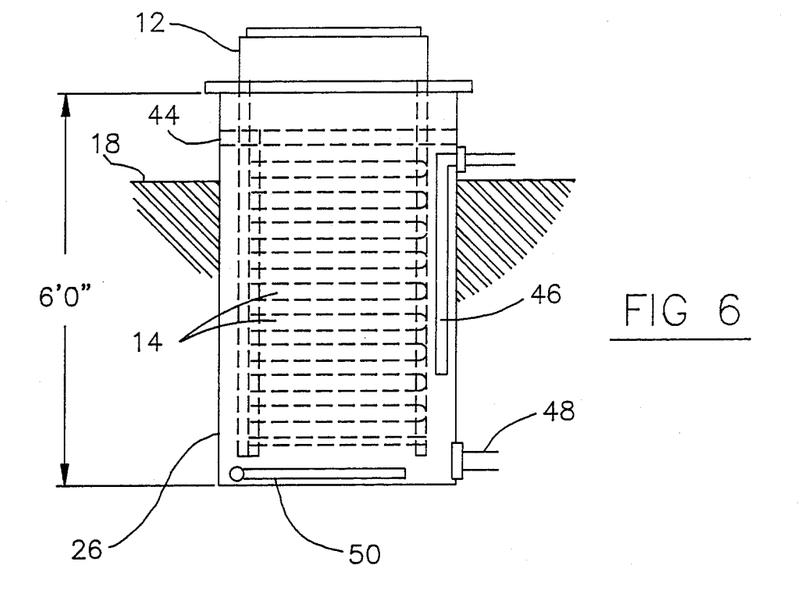
FIG. 6 shows a side sectional view of another embodiment of an ultraviolet lamp module.

FIG. 6 shows an alternative arrangement of jackets 15 and bulbs 17. It is possible to horizontally mount jackets 15 and bulbs 17 in place of vertical mounting, as depicted in FIG. 4, if desired.

Figure 7:
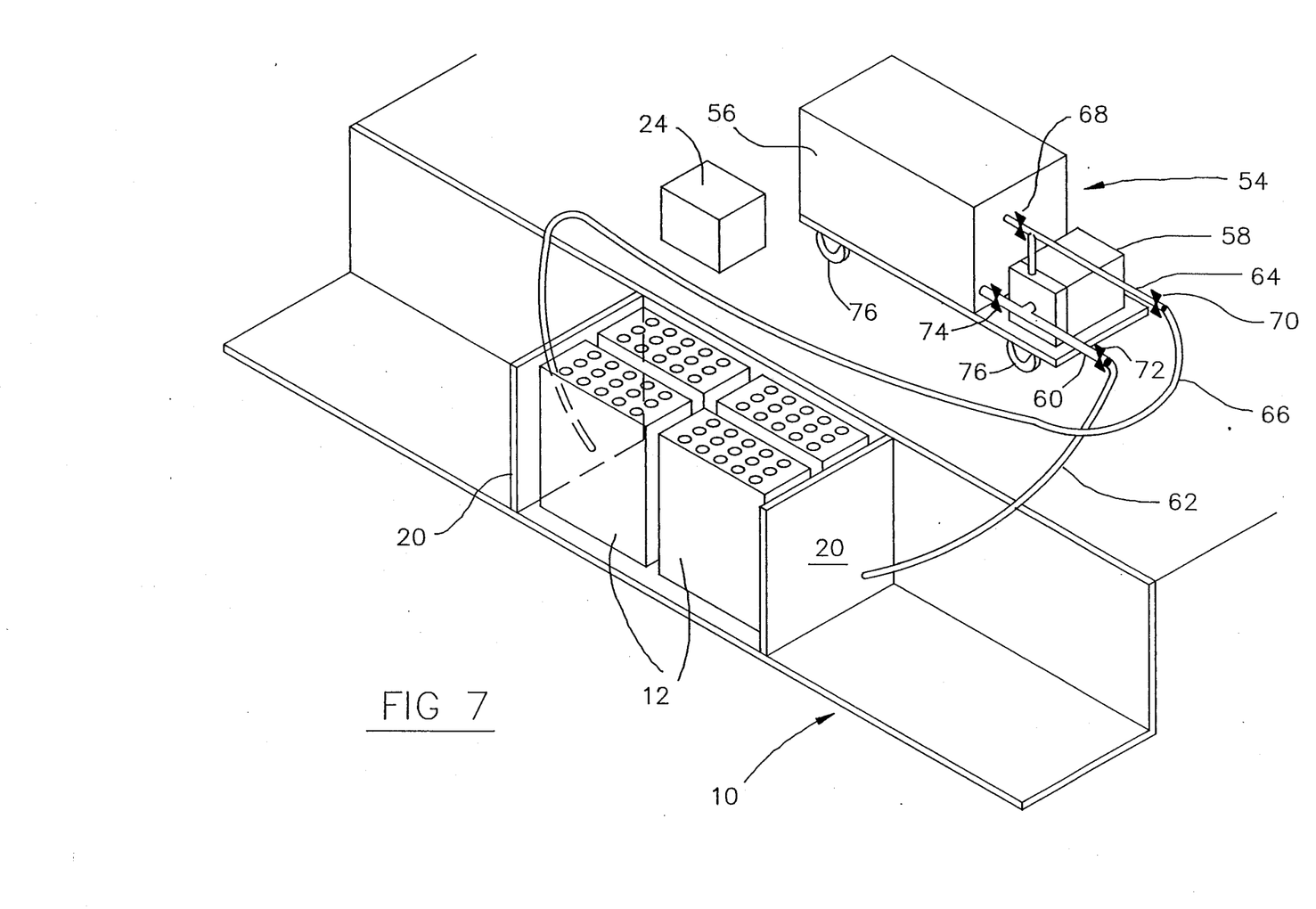
FIG. 7 is a perspective view, taken partially in section, of another embodiment of the invention.

Referring now to FIG. 7, still another alternative embodiment of the invention is shown. Channel 10 contains a plurality of modules 12 sealed from the waste water by way of sealing walls 20. Waste water drains from around modules 12 in between sealing walls 20 by way of channel drain pump 24. Portable cleaning tank system 54 supplies cleaning agent in between sealing walls 20. Portable cleaning tank system 54 has a tank 56 sized to receive modules 12 and cleaning agent pump 58 supplies cleaning agent to the sealed portion of channel 10 and recirculates it back to tank 56.

The pumping system is constructed of receiving pipe 60, which receives recirculated cleaning agent from flexible hose 62. Receiving pipe 60 connects to pump 58. Similarly, pump 58 connects to a recirculation pipe 64, which in turn connects to flexible hose 66 to provide cleaning agent to the sealed portion of channel 10 between sealing walls 20. Supply and receipt of cleaning agent is regulated by valves 68, 70, 72 and 74. Portable cleaning tank system 54 is mounted on roller wheels 76 to facilitate movement along the length of channel 10.

Figure 8:
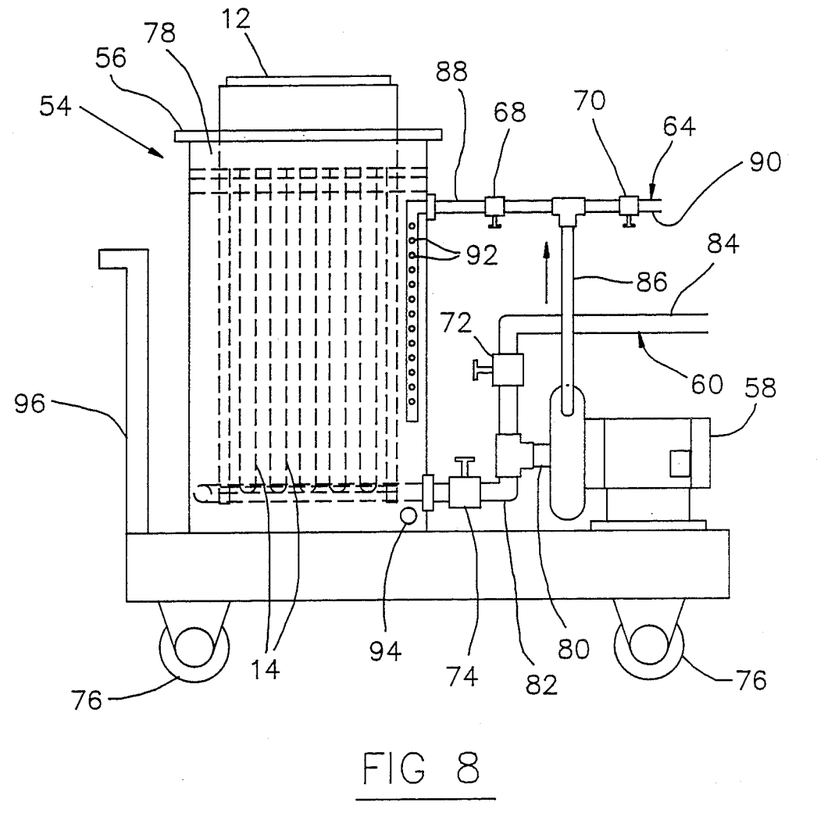
FIG. 8 shows an ultraviolet light lamp module contained in a portable cleaning tank in accordance with aspects of the invention.

FIG. 8 shows an enlarged view of portable cleaning tank system 54, wherein tank 56 contains an ultraviolet light lamp module 12. Module 12 rests on support rack 78 to avoid damage or breakage of ultraviolet light lamps 14. Tank 56 connects to cleaning agent pump 58 by way of receiving pipe 60 and recirculation pipe 64. Receiving pipe 60 is broken into five primary components, namely valves 72 and 74, as well as connector tee 80, tank suction pipe 82 and upstream supply pipe 84. Similarly, recirculation pipe 64 is constructed of five primary parts, namely valves 68 and 70, as well as connector tee 86, tank recirculation pipe 88 and downstream supply pipe 90. Tank recirculation pipe 88 contains a plurality of holes 92 to distribute recirculated cleaning agent throughout the height of tank 56. Tank 56 is also equipped with a tank drain plug 94. Portable cleaning tank system 54 is supported by platform truck 96 which in turn is supported by wheels 76.

Figure 9:
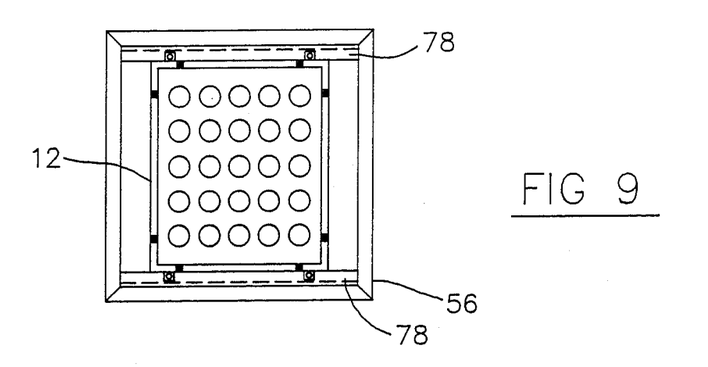
FIG. 9 shows a top partial plan view of the module in tank shown in FIG. 8.

FIG. 9 shows module 12 resting on support racks 78 in tank 56. Pairs of tabs 98 extend outwardly from two sides of module 12, which engage support racks 78 in order to suspend module 12 within tank 56.

Referring now generally to FIGS. 1 to 4, two methods of employing the apparatus of the invention will now be described. Over the course of time, and by passage of quantities of waste water through the channel 10, deposits and film tend to build up on quartz jackets 15 which surround bulbs 17 (See FIG. 4A). Therefore, it becomes necessary to periodically clean quartz jackets 15. For the first time it is now possible to periodically clean, either while in place or in a different location, all or a portion of jacket 15 contained within modules 12 in a quick and efficient manner. Modules 12 can contain any number of lamps 14 to be cleaned, such as 28 lamps for example. Modules 12 are preferably sized to be easily manually movable, such as about 2'×2'×6', but may be of a size to be moved by light moving equipment.

In accordance with one aspect the invention, and as shown in FIGS. 2 and 3, one module 12 is preferably manually removed from channel 10 by or overhead transport crane 42 and transported to cleaning tank 26. Before removing a module 12, it is preferable to first disconnect it from its power supply (not shown). This increases ease of handling of the module as well as safety. Depending upon the type of monitoring and control equipment employed (not shown) this too should be disconnected. The monitoring and control equipment can be any known in the art such as ultraviolet light photodetectors, alarms, view ports, and the like.

While cleaning tank 26 has been depicted as sized to contain only one module 12, it is possible for tank 26 to be larger in order to receive more than one module at a time for cleaning. Before lowering the module 12 into tank 26, the tank is preferably filled approximately half way with cleaning solution. Such cleaning solution typically comprises citric acid mixed with water. However, other cleaning solutions may be employed. After filling tank 26 about half way, module 12 is lowered into the tank so that tabs 52 rest on support rack 44 as shown in FIG. 4. A further appropriate amount of water is preferably added so that jackets 15 are completely submerged.

Pump 30 is then turned on to circulate cleaning agent within the tank and also to blow air through air supply pipe 50 into the tank to enhance cleaning. The pump is operated for preferably about 15 to 30 minutes. However, it is to be noted that the pump operation time depends on the degree of film and particulate buildup on jackets 15. Such buildup depends upon several factors, including the amount of time that has passed since the last cleaning and the tendency of substances contained within the waste water to adhere to quartz jacket 15. After cleaning, module 12 is removed from tank 26 and is replaced back into its original position in channel 10. This method permits the waste water treatment system to continue operations while lamp jacket 15 are methodically cleaned, preferably one at a time.

Another embodiment of the invention facilitates in place cleaning of more than one module 12 at a time. This is accomplished by isolating a portion of channel 10 with sealing walls 20 (See FIG. 1) Walls 20 are preferably lowered from wall lift 37 and into channel 10 by hand. It is, however, within the scope of the invention to have a mechanically operated wall lift 37. Channel drain pump 24 is employed to remove waste water between sealing walls 20, and then further provides fresh water between sealing walls 20. One end of each of flexible hose 32 and 34 are connected to downstream and upstream sealing walls 20, respectively. The remaining ends of flexible hose 32 and 34 are then preferably connected to underground conduits (not shown) that lead to cleaning tank 26. However, it is possible to supply cleaning agent from a source other than tank 26.

In a preferred form of the invention, cleaning tank 26 acts as a cleaning agent injection tank during system cleaning. A quantity of cleaning agent 28 is prepared in cleaning tank 26 prior to injection into channel 10 between sealing walls 20. Cleaning agent pump 30 is then employed to supply cleaning agent 28 through flexible hose 32 into channel 10. Cleaning agent 28 flows in between the individual spaced apart lamps 14 of modules 12, thereby cleaning the quartz jackets surrounding the lamps. Cleaning agent 28 then flows out of channel 10 by way of upstream sealing wall 20, flexible hose 34 and the not shown underground conduit and back into cleaning tank 26. Recirculation of cleaning agent 28 is preferably permitted for about 30 minutes depending upon the degree of fouling of quartz jackets 15. After such time, sealing walls 20 are removed to permit waste water to begin flowing through channel 10 for further cleaning.

Referring now to FIGS. 7 through 9, further preferred embodiment for cleaning modules 12 and jacket 15 are disclosed. In place of cleaning tank 26 as shown in FIG. 1, a portable cleaning tank system 54 may be provided, which is movable along the length of channel 10. By using an overhead transport crane 42 as shown in FIG. 3, or preferably by hand, modules 12 may be lifted and removed from channel 10 for cleaning. It is also possible to employ any other lifting/moving means known in the art.

Modules 12 are hoisted from channel 10 and then taken to tank 56 which is of sufficient size to receive at least one module 12. Prior to lowering the subject module 12 into tank 56, valves 68, 70, 72 and 74 should be closed. It is preferred to fill tank 56 about half way with fresh water. Module 12 is then lowered into tank 56 to rest on support rack 78 to avoid damage to lamps 14. A further quantity of fresh water is preferably added so that jackets 15 are completely submerged. Prior to turning on cleaning agent pump 58, valves 68 and 74 are opened. Pump 58 then engages to permit recirculation of cleaning agent within tank 56 for about 15 to 30 minutes depending upon the degree of the fouling of jackets 15.

After the desired recirculation time, pump 58 is secured and valve 68 and 74 are closed. Module(s) 12 is then cleaned and may be removed from tank 56 and replaced in its original position within channel 10. Alternatively, module 12 may be lowered into tak 56 only to soak without the use of pumping action to circulate the cleaning agent.

It is also possible to employ portable cleaning tank system 54 in a manner to clean more than one module 12 at a time. This is accomplished by preferably manually lowering sealing walls 20 into channel 10 and sealing off the flow of waste water. Channel drain pump 24 drains water between sealing walls 20. Portable cleaning tank system 54 is then engaged to supply cleaning agent to the empty portion of the channel 10. Flexible hose 66 connects on one end to downstream sealing wall 20 and on the other end to recirculation pipe 64. Similarly, flexible hose 62 connects on one end to sealing wall 20, and on the other end to receiving pipe 60. Valves 68, 70, 72 and 74 are first closed and channel drain pump 24 refills the empty portion of channel 10 with fresh water.

Tank 56 is filled with cleaning agent suitable for injection into the portion of channel 10 between sealing walls 20. Valves 70 and 72 are opened. Pump 58 then engages, and simultaneously, valve 74 opens until tank 56 empties. Valve 74 is then placed in the closed position. Cleaning agent is permitted to recirculate through recirculation pump 70, flexible hose 66, the portion of channel 10 to be cleaned, flexible hose 62, receiving pipe 60 and the pump for about 30 minutes depending upon the degree of fouling of jackets 15. After a desired time, pump 58 is secured. Lamps 14 are reenergized and then sealing walls 20 are removed.

In the above-described methods, it is possible for the first time to quickly and efficiently clean either a portion or all of jackets 15 effectively. In situations where it is undesirable to stop treatment of flowing waste water within channel 10, it is possible to employ modules 12 of the invention to be able to remove a portion of lamps 14 for cleaning of jackets 15. In situations where it is possible to shut down treatment of the flowing waste water in channel 10, the same apparatus may be employed. The present invention provides a flexible cleaning system wherein lamp modules may be cleaned: in place, with or without the assistance of a statutory cleaning tank; in place, with or without the assistance of a mobile or portable cleaning tank; in a stationary tank; or in a mobile or portable tank, depending upon the particulars of the system to be cleaned.

Although this invention has been described in connection with specific forms thereof, it will be appreciated that a wide array of equivalents may be substituted for the specific elements shown and described herein without departing from the spirit and scope of this invention as described in the appended claims.

I claim:

1. In a method of disinfecting waste water wherein ultraviolet light producing lamps are positioned in lamp modules and contained within quartz lamp jackets and wherein said modules are positioned within a flow of said water, a process for removing particulates and films from said lamp jackets comprising removing one or more of said modules from said flow and inserting said removed modules into a tank containing a lamp jacket cleaning agent wherein said lamp jackets are submerged in said cleaning agent and cleaned by direct contact.

2. A process as defined in claim 1 wherein said modules are removed and cleaned one at a time.

3. A process as defined in claim 1 further comprising subjecting said cleaning agent to agitation to enhance cleaning of said jackets.

4. A process as defined in claim 1 wherein said tank is portable.

5. A process as defined in claim 1 further comprising circulating said cleaning agent in and out of said tank.

6. A process as defined in claim 1 wherein said modules are removed manually.

7. A cleaning system for removing particulates and films from lamp jackets surrounding ultraviolet light lamps contained in lamp modules comprising:
a tank sized to receive one or more of said lamps and jacket cleaning agent contained within said tank capable of removing said particulates and film.

8. Apparatus as defined in claim 7 further comprising agitation means connected to agitate said cleaning agent.

9. Apparatus as defined in claim 7 further comprising a circulation pump connected to circulate said cleaning agent.

10. Apparatus as defined in claim 7 further comprising a platform and wheels upon which said tank is positioned.

11. Apparatus as defined in claim 7 further comprising module support means connected to said tank and sized to receive said modules to safely mount said modules within said tank for cleaning.

* * * * *